US012139221B2

United States Patent
Nakajima et al.

(10) Patent No.: US 12,139,221 B2
(45) Date of Patent: Nov. 12, 2024

(54) VEHICLE STEERING SYSTEM

(71) Applicant: Mitsubishi Electric Corporation, Tokyo (JP)

(72) Inventors: Shunsuke Nakajima, Tokyo (JP); Kenta Tominaga, Tokyo (JP); Michihiro Ogata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 219 days.

(21) Appl. No.: 17/790,279

(22) PCT Filed: May 27, 2020

(86) PCT No.: PCT/JP2020/020826
§ 371 (c)(1),
(2) Date: Jun. 30, 2022

(87) PCT Pub. No.: WO2021/240666
PCT Pub. Date: Dec. 2, 2021

(65) Prior Publication Data
US 2023/0034231 A1 Feb. 2, 2023

(51) Int. Cl.
*B62D 6/00* (2006.01)
(52) U.S. Cl.
CPC .................................. *B62D 6/003* (2013.01)
(58) Field of Classification Search
CPC .............................. B62D 6/003; B62D 15/025
(Continued)

(56) References Cited

U.S. PATENT DOCUMENTS

| 6,263,270 | B1 | 7/2001 | Sato et al. |
| 2016/0362136 | A1 | 12/2016 | Oya |

(Continued)

FOREIGN PATENT DOCUMENTS

| JP | 10-152063 A | 6/1998 |
| JP | 2000-198458 A | 7/2000 |

(Continued)

OTHER PUBLICATIONS

Communication dated Mar. 7, 2023 from the Japanese Patent Office in Application No. 2022-527338.
(Continued)

*Primary Examiner* — Hai H Huynh
(74) *Attorney, Agent, or Firm* — Sughrue Mion, PLLC; Richard C. Turner

(57) ABSTRACT

The vehicle steering system includes: a predicted lateral deviation fluctuation amount calculation circuitry to calculate a predicted lateral deviation fluctuation amount predicted as a lateral deviation fluctuation amount with respect to the target traveling line of the vehicle; and a steering control amount limiting circuitry to output a limited steering control amount to which the steering control amount is limited by the steering control amount limit value on the basis of a steering force and the predicted lateral deviation fluctuation amount, and in a case where the absolute value of the steering force is the same, when the absolute value of the predicted lateral deviation fluctuation amount is large, the steering control amount limiting circuitry sets the steering control amount limit value to a value larger than or equal to that when the absolute value of the predicted lateral deviation fluctuation amount is small.

10 Claims, 9 Drawing Sheets

(58) Field of Classification Search
USPC ..................................................... 701/41–44
See application file for complete search history.

(56) References Cited

U.S. PATENT DOCUMENTS

2019/0315404 A1    10/2019  Hayashi et al.
2023/0202558 A1*    6/2023  Ogata .................. B60W 50/08
                                                               701/41

FOREIGN PATENT DOCUMENTS

| JP | 3585874      | * 11/2004 | ............... B62D 6/00 |
| JP | 2017-047799 A |   3/2017 | |
| JP | 2018-534208 A |  11/2018 | |
| JP | 2019-182303 A |  10/2019 | |

OTHER PUBLICATIONS

International Search Report for PCT/JP2020/020826 dated Aug. 18, 2020.
Written Opinion for PCT/JP2020/020826 dated Aug. 18, 2020.
Extended European Search Report issued Jun. 16, 2023 in Application No. 20937313.3.

* cited by examiner

VEHICLE STEERING SYSTEM

CROSS REFERENCE TO RELATED APPLICATIONS

This application is a National Stage of International Application No. PCT/JP2020/020826 filed May 27, 2020.

TECHNICAL FIELD

The present disclosure relates to a vehicle steering system.

BACKGROUND ART

In a vehicle steering system that performs steering assistance such that a vehicle travels so as to follow a desired target traveling line, a technology for reducing the burden on a driver by reducing the interference between steering by the driver and the steering assistance is proposed. For example, only when the traveling position of the vehicle moves across a threshold line that is set outward of the target traveling line in the lane width direction, a steering control amount in the direction of a steering reaction force acting with respect to steering by the driver is increased, thereby calling attention without making the driver feel annoyed (see, for example, Patent Document 1).

CITATION LIST

Patent Document

Patent Document 1: Japanese Laid-Open Patent Publication No. 2019-182303

SUMMARY OF THE INVENTION

Problems to be Solved by the Invention

In the conventional vehicle steering system, since the steering control amount is increased on the basis of the deviation in the lane width direction between the traveling position of the vehicle and the target traveling line, when the driver steers the vehicle so as to stay on a traveling line, in the lane, which is located outward of the threshold line, for example, when the driver desires to drive on the inner side of the curve on a curved road, a steering control amount in a direction following the target traveling line is increased, thereby causing a problem that a burden is imposed on the driver.

The present disclosure has been made to solve the above problem, and an object of the present disclosure is to provide a vehicle steering system that reduces the burden on a driver.

Solution to the Problems

A vehicle steering system according to the present disclosure includes: a steering input unit on which steering operation is performed by a driver; a steering force detection unit for detecting a steering force inputted to the steering input unit; a steering control amount calculation unit for calculating a steering control amount for causing a vehicle to follow a target traveling line; a predicted lateral deviation fluctuation amount calculation unit for calculating a predicted lateral deviation fluctuation amount predicted as a lateral deviation fluctuation amount with respect to the target traveling line of the vehicle; a steering control amount limiting unit for calculating a steering control amount limit value on the basis of the steering force and the predicted lateral deviation fluctuation amount, and outputting a limited steering control amount to which the steering control amount is limited by the steering control amount limit value; and a steering control unit for performing steering control of the vehicle on the basis of the limited steering control amount, and in a case where the absolute value of the steering force is the same, when the absolute value of the predicted lateral deviation fluctuation amount is large, the steering control amount limiting unit sets the steering control amount limit value to a value larger than or equal to that when the absolute value of the predicted lateral deviation fluctuation amount is small.

Effect of the Invention

The vehicle steering system according to the present disclosure includes: a steering control amount calculation unit for calculating a steering control amount for causing a vehicle to follow a target traveling line; a predicted lateral deviation fluctuation amount calculation unit for calculating a predicted lateral deviation fluctuation amount predicted as a lateral deviation fluctuation amount with respect to the target traveling line of the vehicle; and a steering control amount limiting unit for calculating a steering control amount limit value on the basis of a steering force and the predicted lateral deviation fluctuation amount, and outputting a limited steering control amount to which the steering control amount is limited by the steering control amount limit value, and in a case where the absolute value of the steering force is the same, when the absolute value of the predicted lateral deviation fluctuation amount is large, the steering control amount limiting unit sets the steering control amount limit value to a value larger than or equal to that when the absolute value of the predicted lateral deviation fluctuation amount is small. Therefore, when it is predicted that the driver is intentionally driving on a line different from the target traveling line without moving away from the target traveling line, it is possible to reduce the burden on the driver.

DESCRIPTION OF EMBODIMENTS

Figure 1:
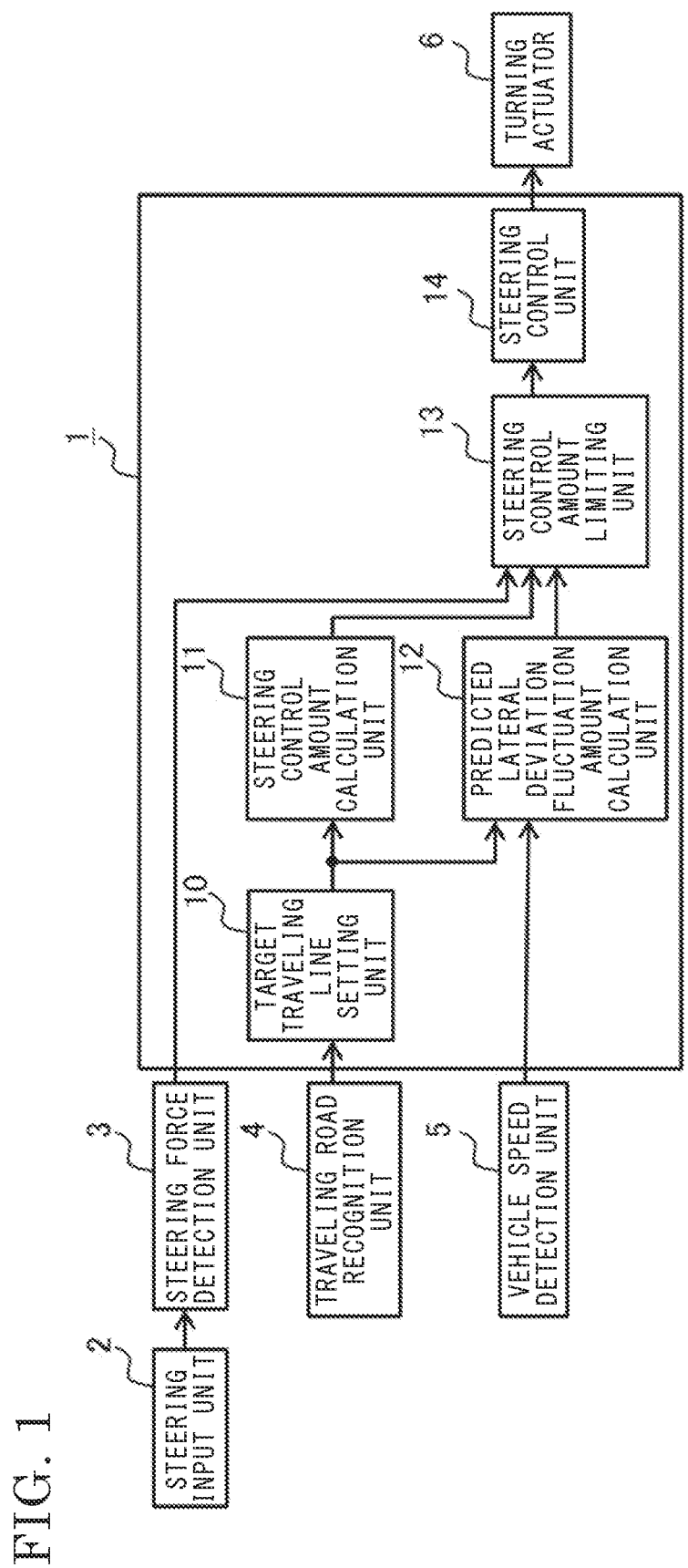
FIG. 1 is a block diagram showing the configuration of a vehicle steering system according to Embodiment 1.

Hereinafter, vehicle steering systems according to embodiments for carrying out the present disclosure will be described in detail with reference to the drawings. In the drawings, the same reference characters denote the same or corresponding parts.

Embodiment 1

FIG. 1 is a block diagram showing the configuration of a vehicle steering system according to Embodiment 1. The vehicle steering system according to Embodiment 1 includes a steering device 1, a steering input unit 2, a steering force detection unit 3, a traveling road recognition unit 4, a vehicle speed detection unit 5, and a turning actuator 6. In the present specification, the "vehicle" refers to a vehicle equipped with the steering device 1. The steering device 1 includes a target traveling line setting unit 10, a steering control amount calculation unit 11, a predicted lateral deviation fluctuation amount calculation unit 12, a steering control amount limiting unit 13, and a steering control unit 14. A steering force detected by the steering force detection unit 3 is inputted to the steering control amount limiting unit 13, traveling road information detected by the traveling road recognition unit 4 is inputted to the target traveling line setting unit 10, a vehicle speed detected by the vehicle speed detection unit 5 is inputted to the predicted lateral deviation fluctuation amount calculation unit 12, and the output from the steering control unit 14 is inputted to the turning actuator 6. The steering device 1 may have a control function of a general electric power steering device.

The steering input unit 2 is, for example, a steering wheel on which steering operation is performed by a driver. The steering input unit 2 may be any input means such as a joystick or a switch as long as the input means is operated by the driver in order to steer the vehicle. The steering force detection unit 3 is, for example, a torque sensor connected to the steering input unit 2, and detects a steering force inputted to the steering input unit 2 by the driver and outputs the steering force to the steering device 1.

The traveling road recognition unit 4 recognizes boundary lines of a lane such as a line outside a roadway of a traveling road in front of the vehicle, the boundary line of the roadway, and the center line of the roadway, from an image, of an area in front of the vehicle, taken by a camera or the like. Next, the traveling road recognition unit 4 recognizes the traveling road on which the vehicle travels, from the positions of the boundary lines of the lane in a vehicle coordinate system, and outputs the traveling road as traveling road information to the steering device 1. The vehicle coordinate system is a coordinate system having an origin that is set in the vehicle. The traveling road recognition unit 4 generates traveling road information from an image taken by the camera, but any method may be used as long as traveling road information can be generated by this method. For example, the traveling road recognition unit 4 may acquire position information of the vehicle from an artificial satellite and may generate traveling road information on the basis of map information and the acquired position information, or may generate traveling road information on the basis of a traveling trajectory, of a vehicle traveling ahead, which is acquired by a radar, a camera, or the like.

The vehicle speed detection unit 5 detects the vehicle speed of the vehicle and outputs the vehicle speed to the steering device 1. The turning actuator 6 generates a turning force according to the output from the steering control unit 14 to steer the vehicle. The turning actuator 6 is, for example, a hydraulic motor or an electric motor for electric power steering, and the type of the electric motor is not particularly limited and may be either a DC motor or an AC motor.

Next, the configuration of the steering device 1 will be described. The target traveling line setting unit 10 sets a target traveling line, which is a target for causing the vehicle to travel so as to follow the traveling road, on the traveling road on the basis of the traveling road information, in the vehicle coordinate system, which is acquired from the traveling road recognition unit 4, and outputs information of the target traveling line to the steering control amount calculation unit 11 and the predicted lateral deviation fluctuation amount calculation unit 12. The target traveling line is set, for example, at a position separated by a predetermined distance from a boundary line on the right side of the lane in the vehicle coordinate system. When the target traveling line is set at a position separated by ½ of the width of the traveling road from the boundary line on the right side of the lane, it means that the target traveling line is set at the center of the traveling road. The position of the target traveling line on the traveling road may be changed according to the driver's preference or the surrounding environment.

The steering control amount calculation unit 11 calculates a steering control amount for causing the vehicle to follow the target traveling line, on the basis of the information of the target traveling line acquired from the target traveling line setting unit 10, and outputs the steering control amount to the steering control amount limiting unit 13. Here, the method for obtaining the steering control amount in the steering control amount calculation unit 11 may be any method as long as the method is for obtaining a steering control amount for following the target traveling line, such as setting a target torque for driving a turning actuator as a steering control amount as described in Japanese Patent No. 6012824.

Figure 2:
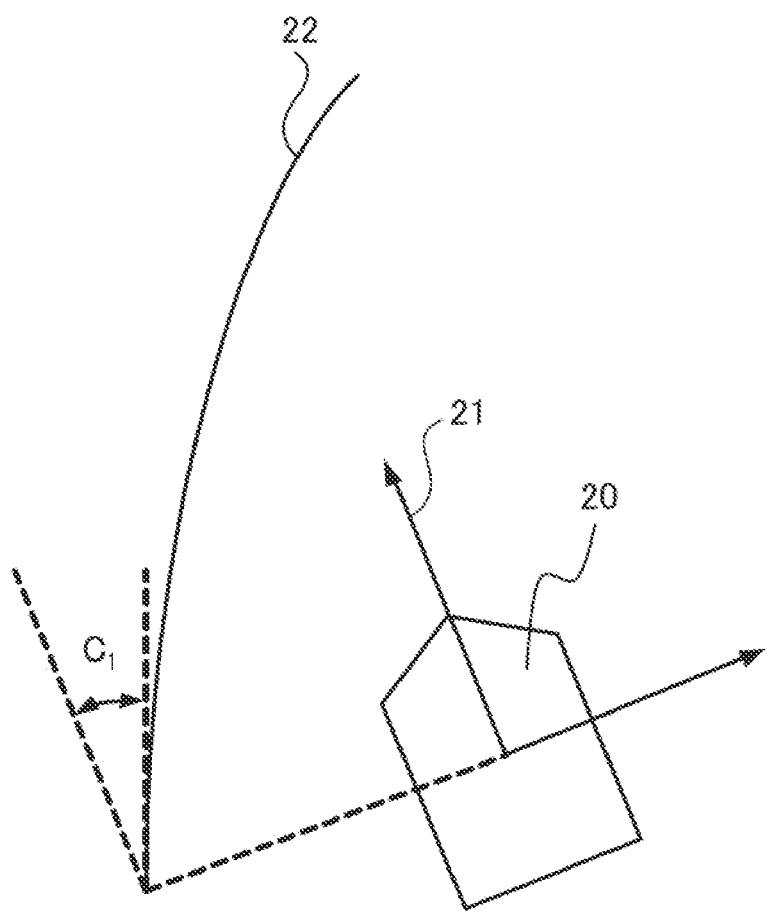
FIG. 2 is a diagram showing a yaw angle in the vehicle steering system according to Embodiment 1.

On the basis of the target traveling line acquired from the target traveling line setting unit 10, the predicted lateral deviation fluctuation amount calculation unit 12 initially obtains a yaw angle which is an angle formed by the traveling direction of the vehicle and the target traveling line. FIG. 2 is a diagram showing a yaw angle in the vehicle steering system according to Embodiment 1. In FIG. 2, an angle formed by a traveling direction 21 of a vehicle 20 and a target traveling line 22 is a yaw angle $C_1$. Next, the predicted lateral deviation fluctuation amount calculation unit 12 obtains a lateral speed $V_y$, which is the speed in the lane width direction of the vehicle, by the following equation from the obtained yaw angle $C_1$ and a vehicle speed $V_x$ acquired from the vehicle speed detection unit 5, and outputs the lateral speed $V_y$ as a predicted lateral deviation fluctuation amount to the steering control amount limiting unit 13. The fluctuation of a lateral deviation of the vehicle increases as the lateral speed $V_y$ increases. Thus, the lateral deviation fluctuation can be predicted on the basis of the lateral speed $V_y$. Here, the yaw angle is defined as the angle formed by the traveling direction of the vehicle and the target traveling line in FIG. 2, but may be defined as an angle formed by the traveling direction of the vehicle and the target traveling line in the lateral direction of the vehicle at a position frontward of the vehicle by a predetermined distance, and in either case, the yaw angle can be easily calculated geometrically from the target traveling line in the vehicle coordinate system.

$$V_y = V_x \tan C_1 \qquad (1)$$

A lateral deviation that is the deviation in the lane width direction between the traveling position of the vehicle and the target traveling line may be obtained, and a predicted lateral deviation fluctuation amount may be calculated on the basis of an amount of change in the lateral deviation. In this case, for example, the lateral deviation may be sampled at a predetermined cycle, and an amount of temporal change in the lateral deviation may be used as the predicted lateral deviation fluctuation amount.

Moreover, the yaw angle itself may be used as the predicted lateral deviation fluctuation amount. The fluctuation of the lateral deviation of the vehicle increases as the yaw angle increases. Thus, the lateral deviation fluctuation can be predicted on the basis of the yaw angle.

The steering control amount limiting unit 13 initially calculates a steering control amount limit value for decreasing a steering control amount during steering operation by the driver, that is, during overriding, from the steering force acquired from the steering force detection unit 3 and the predicted lateral deviation fluctuation amount acquired from the predicted lateral deviation fluctuation amount calculation unit 12. Next, the steering control amount limiting unit 13 obtains a limited steering control amount to which the steering control amount acquired from the steering control amount calculation unit 11 is limited by the steering control amount limit value, and outputs the limited steering control amount to the steering control unit 14.

Figure 3:
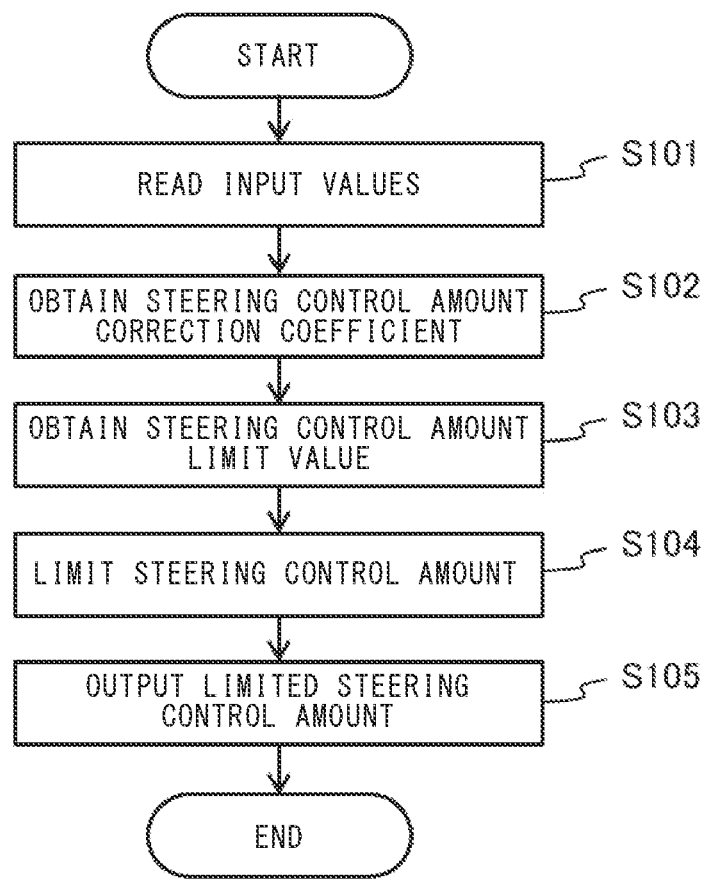
FIG. 3 is a flowchart illustrating the operation of a steering control amount limiting unit in the vehicle steering system according to Embodiment 1.

Next, the operation of the steering control amount limiting unit 13 will be described in detail. FIG. 3 is a flowchart illustrating the operation of the steering control amount limiting unit 13. In step S101, the steering control amount limiting unit 13 reads, as input values, the steering force outputted by the steering force detection unit 3, the steering control amount outputted by the steering control amount calculation unit 11, and the predicted lateral deviation fluctuation amount outputted by the predicted lateral deviation fluctuation amount calculation unit 12.

In step S102, a steering control amount correction coefficient $\alpha$ is obtained from the steering force and the predicted lateral deviation fluctuation amount which are read as the input values in step S101. The steering control amount correction coefficient $\alpha$ is, for example, a coefficient in the range from 0 to 1. When $\alpha=1$, a steering control amount for lane keeping is 100%, and this state is a state where the vehicle steering system assists steering operation and follows the target traveling line. In addition, when $\alpha=0$, a steering control amount for lane keeping is 0%, and this state is a state of manual steering by the driver. Therefore, when $0<\alpha<1$, a steering control amount for lane keeping is $\alpha \times 100\%$, and this state is an intermediate state between the state where the vehicle steering system assists steering operation and follows the target traveling line and the state of manual steering by the driver. At this time, steering operation is performed by the driver, but steering control by the vehicle steering system is intervening in the steering operation by the driver.

Figure 4:
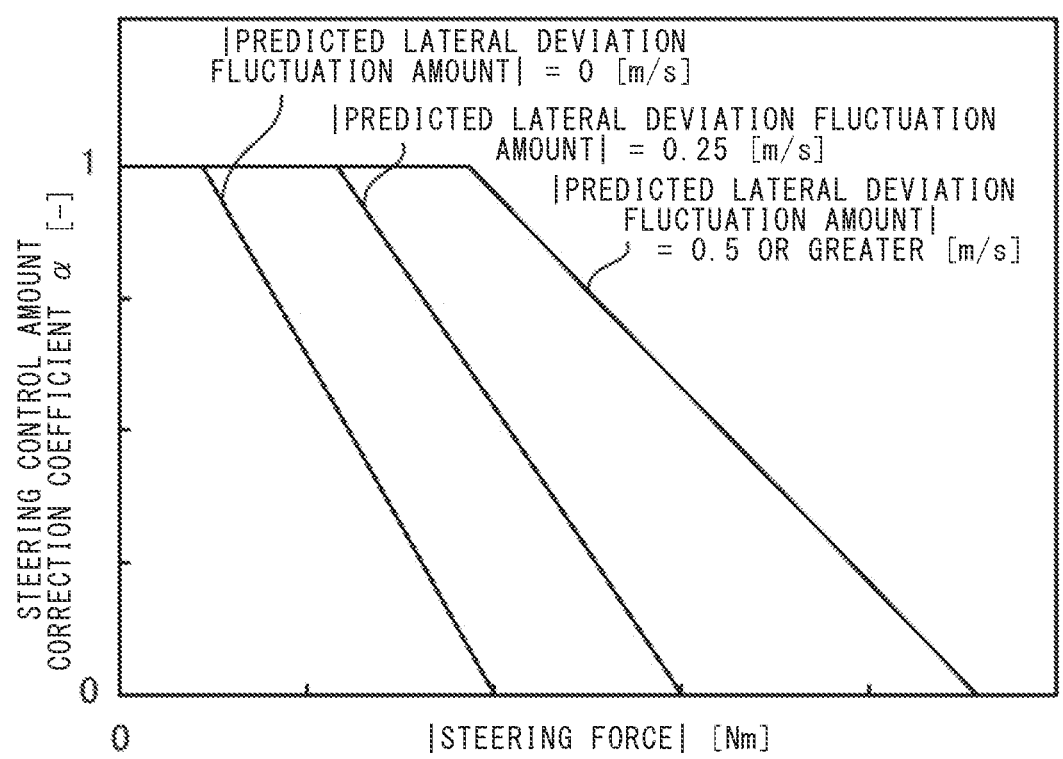
FIG. 4 is a diagram showing the relationship between the absolute value of a steering force, a predicted lateral deviation fluctuation amount, and a steering control amount correction coefficient in the vehicle steering system according to Embodiment 1.

Next, a method for obtaining the steering control amount correction coefficient $\alpha$ from the steering force and the predicted lateral deviation fluctuation amount will be described. FIG. 4 is a diagram showing the relationship between the absolute value of the steering force, the predicted lateral deviation fluctuation amount, and the steering control amount correction coefficient, and is a graph showing maps used when the steering control amount correction coefficient $\alpha$ is obtained from the absolute value of the steering force. FIG. 4 shows three lines, a line showing a "map when the absolute value of the predicted lateral deviation fluctuation amount is zero", a line showing a "map when the absolute value of the predicted lateral deviation fluctuation amount is 0.25", and a line showing a "map when the absolute value of the predicted lateral deviation fluctuation amount is 0.5 or greater". In each map, when the absolute value of the predicted lateral deviation fluctuation amount is constant, a characteristic is shown in which $\alpha=1$ when the absolute value of the steering force is zero, the steering control amount correction coefficient $\alpha$ does not change or decreases as the absolute value of the steering force increases, and finally $\alpha$ becomes 0. In addition, in a case where the absolute value of the steering force is the same, when the absolute value of the predicted lateral deviation fluctuation amount is large, the steering control amount correction coefficient $\alpha$ is set to a value larger than or equal to that when the absolute value of the predicted lateral deviation fluctuation amount is small.

When the absolute value of the predicted lateral deviation fluctuation amount is an intermediate value between the values of the preset maps, the steering control amount correction coefficient $\alpha$ is obtained by linearly interpolating the values of the preset two maps. For example, when the absolute value of the predicted lateral deviation fluctuation amount is 0.1, the steering control amount correction coefficient $\alpha$ when the absolute value of the predicted lateral deviation fluctuation amount is 0.1 is obtained by linearly interpolating the values of the preset "map when the absolute value of the predicted lateral deviation fluctuation amount is zero" and the preset "map when the absolute value of the predicted lateral deviation fluctuation amount is 0.25". Accordingly, even when the predicted lateral deviation fluctuation amount fluctuates, the steering control amount correction coefficient $\alpha$ changes continuously, so that the steering control amount does not change discontinuously.

Also, in each map shown in FIG. 4, the characteristic thereof is represented by a polygonal line, but the shape of the characteristic may be any shape as long as the characteristic is a characteristic in which the value of the steering control amount correction coefficient $\alpha$ is the same or decreases when the absolute value of the steering force increases.

The steering control amount correction coefficient $\alpha$ is obtained by using the maps, but processing may be performed using a table. By obtaining the steering control amount correction coefficient $\alpha$ using the maps or the table as described above, the steering control amount correction coefficient $\alpha$ can be easily obtained. The method for obtaining the steering control amount correction coefficient $\alpha$ may be any method as long as: in a case where the absolute value of the predicted lateral deviation fluctuation amount is the same, $\alpha=1$ when the absolute value of the steering force is zero, the steering control amount correction coefficient $\alpha$ does not change or decreases when the absolute value of the steering force increases, and finally $\alpha$ becomes 0; and in a case where the absolute value of the steering force is the same, when the absolute value of the predicted lateral deviation fluctuation amount is large, the value of the steering control amount correction coefficient $\alpha$ is the same or larger as compared with that when the absolute value of the predicted lateral deviation fluctuation amount is small. For example, an amount of increase or decrease in the steering control amount correction coefficient may be obtained from the steering force and the predicted lateral deviation fluctuation amount without using any map or table.

In step S103, the steering control amount limit value is obtained by multiplying the steering control amount correction coefficient α obtained in step S102 by the absolute value of the steering control amount acquired from the steering control amount calculation unit 11 in step S101. In a case where the absolute value of the steering force is the same, when the absolute value of the predicted lateral deviation fluctuation amount is large, the steering control amount correction coefficient α is set to a value larger than or equal to that when the absolute value of the predicted lateral deviation fluctuation amount is small, so that when the absolute value of the predicted lateral deviation fluctuation amount is large, the steering control amount limit value is a value larger than or equal to that when the absolute value of the predicted lateral deviation fluctuation amount is small. The steering control amount limit value may be obtained, for example, by multiplying the steering control amount correction coefficient α by a predetermined set value. In this case, the set value is the upper limit of the steering control amount by steering operation assistance for lane keeping.

The steering control amount correction coefficient α is obtained in step S102, and the steering control amount limit value is obtained in step S103. However, any methods may be used as long as, in a case where the absolute value of the steering force is the same, when the absolute value of the predicted lateral deviation fluctuation amount is large, the steering control amount limit value is a value larger than or equal to that when the absolute value of the predicted lateral deviation fluctuation amount is small.

In step S104, the limited steering control amount to which the steering control amount acquired from the steering control amount calculation unit 11 in step S101 is limited such that the absolute value of the steering control amount is equal to or smaller than the steering control amount limit value obtained in step S103 is obtained. In step S105, the limited steering control amount obtained in step S104 is outputted to the steering control unit 14.

The steering control unit 14 generates a turning force with the turning actuator 6 on the basis of the limited steering control amount acquired from the steering control amount limiting unit 13, and performs steering control of the vehicle.

As described above, the vehicle steering system according to Embodiment 1 includes: the steering input unit 2 on which steering operation is performed by a driver; the steering force detection unit 3 for detecting a steering force inputted to the steering input unit 2; the steering control amount calculation unit 11 for calculating a steering control amount for causing the vehicle to follow the target traveling line; the predicted lateral deviation fluctuation amount calculation unit 12 for calculating a predicted lateral deviation fluctuation amount predicted as a lateral deviation fluctuation amount with respect to the target traveling line of the vehicle; the steering control amount limiting unit 13 for calculating a steering control amount limit value on the basis of the steering force and the predicted lateral deviation fluctuation amount, and outputting a limited steering control amount to which the steering control amount is limited by the steering control amount limit value; and the steering control unit 14 for performing steering control of the vehicle on the basis of the limited steering control amount, and in a case where the absolute value of the steering force is the same, when the absolute value of the predicted lateral deviation fluctuation amount is large, the steering control amount limiting unit 13 sets the steering control amount limit value to a value larger than or equal to that when the absolute value of the predicted lateral deviation fluctuation amount is small. Therefore, in a case of overriding by the driver, when the predicted lateral deviation fluctuation amount with respect to the target traveling line of the vehicle is large and it is predicted that the vehicle will be moved in the lateral direction in the lane in the direction in which the distance to the target traveling line is changed, the steering control amount limit value is set to a larger or equal value, so that it is possible to effectively notify the driver that the distance to the target traveling line is changing. Furthermore, when the predicted lateral deviation fluctuation amount with respect to the target traveling line of the vehicle is small and it is predicted that the driver is intentionally driving on a line different from the target traveling line without moving away from the target traveling line, the value of the steering control amount limit value becomes smaller and the steering control amount becomes smaller, so that it is possible to reduce the burden on and the discomfort to the driver.

Embodiment 2

Figure 5:
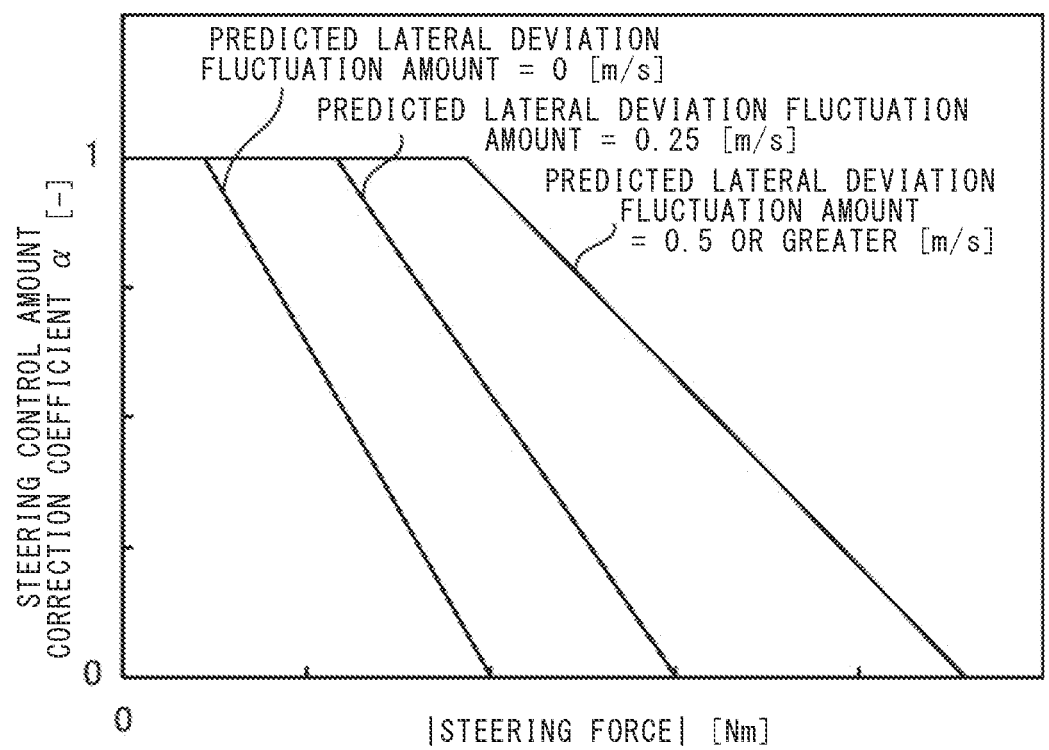
FIG. 5 is a diagram showing the relationship between the absolute value of a steering force, a predicted lateral deviation fluctuation amount, and a steering control amount correction coefficient in a vehicle steering system according to Embodiment 2.

The configuration of a vehicle steering system according to Embodiment 2 is the same as the configuration of the vehicle steering system according to Embodiment 1 shown in FIG. 1, but the operation in step S102 in the flowchart showing the operation of the steering control amount limiting unit 13 shown in FIG. 3 is different. FIG. 5 is a diagram showing the relationship between the absolute value of a steering force, a predicted lateral deviation fluctuation amount, and a steering control amount correction coefficient in the steering control amount limiting unit 13 of the vehicle steering system according to Embodiment 2, and is a graph showing maps used when the steering control amount correction coefficient α is obtained from the absolute value of the steering force.

In the vehicle steering system according to Embodiment 2, the predicted lateral deviation fluctuation amount is a value obtained by predicting a lateral deviation fluctuation amount which is a fluctuation amount of a lateral deviation in which a value in the direction deviating from the target traveling line is positive and a value in the direction following the target traveling line is negative. That is, when the predicted lateral deviation fluctuation amount is a negative value, the vehicle is approaching the target traveling line. The positive/negative sign of the predicted lateral deviation fluctuation amount may be determined, for example, from the relationship between the traveling direction of the vehicle and the target traveling line acquired from the target traveling line setting unit 10 when the predicted lateral deviation fluctuation amount is obtained in the predicted lateral deviation fluctuation amount calculation unit 12. For example, when the predicted lateral deviation fluctuation amount is obtained by using equation (1), the yaw angle in the direction deviating from the target traveling line is defined as positive. Alternatively, the value of the yaw angle may be obtained on the basis of a predetermined direction, the lateral speed $V_y$ may be obtained by using equation (1), and then the positive/negative sign may be determined when the predicted lateral deviation fluctuation amount is outputted.

In the steering control amount limiting unit 13 of the vehicle steering system according to Embodiment 2, when the predicted lateral deviation fluctuation amount is large with respect to the direction deviating from the target traveling line, the steering control amount limit value is set to a larger or equal value or the same value as compared with that when the predicted lateral deviation fluctuation amount is small with respect to the direction deviating from the target traveling line and the predicted lateral deviation fluctuation amount is a negative value. Accordingly, in a case of overriding by the driver, only when the predicted lateral deviation fluctuation amount is large in the direction deviating from the target traveling line of the vehicle, the steering control amount in the direction following the target traveling line is increased, so that it is possible to effectively notify the driver that the vehicle is deviating from the target traveling line. Furthermore, when the predicted lateral deviation fluctuation amount with respect to the target traveling line of the vehicle is small and it is predicted that the driver is intentionally driving on a line different from the target traveling line without moving away from the target traveling line, or when the predicted lateral deviation fluctuation amount with respect to the target traveling line of the vehicle is a negative value and it is predicted that the vehicle is traveling in the direction approaching the target traveling line, the value of the steering control amount limit value becomes smaller and the steering control amount becomes smaller, so that it is possible to reduce the burden on and the discomfort to the driver.

Embodiment 3

Figure 6:
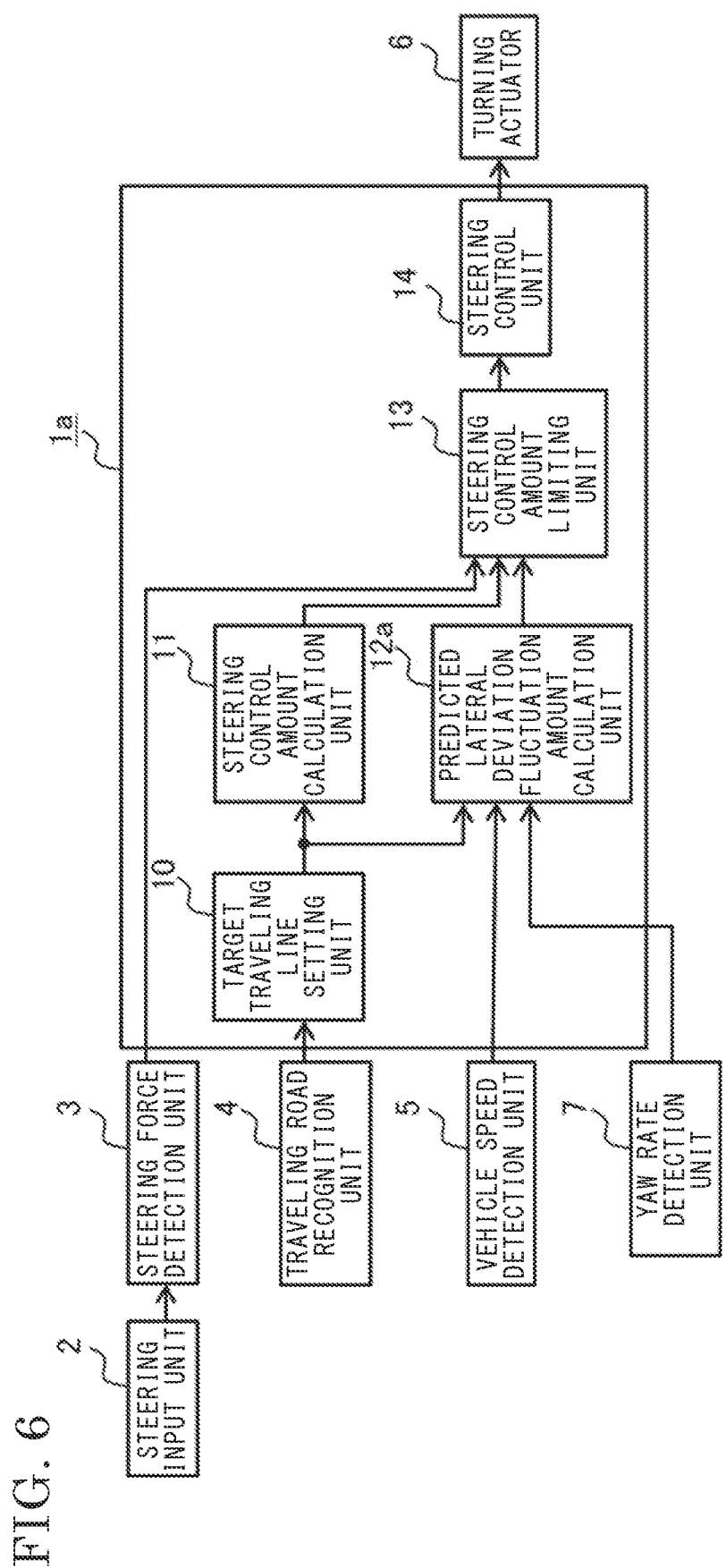
FIG. 6 is a block diagram showing the configuration of a vehicle steering system according to Embodiment 3.

FIG. 6 is a block diagram showing the configuration of a vehicle steering system according to Embodiment 3. The vehicle steering system in FIG. 6 is different from the vehicle steering system according to Embodiment 1 or Embodiment 2 in that the output of a yaw rate detection unit 7 is inputted to a predicted lateral deviation fluctuation amount calculation unit 12a of a steering device 1a.

The yaw rate detection unit 7 detects a yaw rate $\gamma$ of the vehicle and outputs the yaw rate $\gamma$ to the predicted lateral deviation fluctuation amount calculation unit 12a. On the basis of the target traveling line acquired from the target traveling line setting unit 10, the predicted lateral deviation fluctuation amount calculation unit 12a initially obtains a curvature $C_2$ of the target traveling line. Next, the predicted lateral deviation fluctuation amount calculation unit 12a obtains a yaw rate component $\Delta\gamma$ deviating from the target traveling line, by the following equation from the obtained curvature $C_2$, the vehicle speed $V_x$ acquired from the vehicle speed detection unit 5, and the yaw rate $\gamma$ acquired from the yaw rate detection unit 7, and outputs the yaw rate component $\Delta\gamma$ as a predicted lateral deviation fluctuation amount to the steering control amount limiting unit 13. As for the positive/negative sign of the predicted lateral deviation fluctuation amount, similar to Embodiment 2, the direction deviating from the target traveling line is defined as a positive direction.

$$\Delta\gamma = \gamma - C_2 V_x \qquad (2)$$

$\Delta\gamma$ is the difference between the yaw rate of the vehicle and the yaw rate required for cornering on the target traveling line, that is, the value of the yaw rate component deviating from the target traveling line. If the value of the yaw rate component deviating from the target traveling line is the predicted lateral deviation fluctuation amount, when the predicted lateral deviation fluctuation amount is large, the vehicle can be regarded as moving in the lateral direction in the lane, and when the predicted lateral deviation fluctuation amount is small, the driver can be regarded as intentionally driving on a line different from the target traveling line. Therefore, the same effects as those of the vehicle steering system according to Embodiment 1 or Embodiment 2 can be achieved.

The yaw rate detection unit 7 may detect the steering angle of the vehicle and may convert the steering angle into a yaw rate.

Embodiment 4

Figure 7:
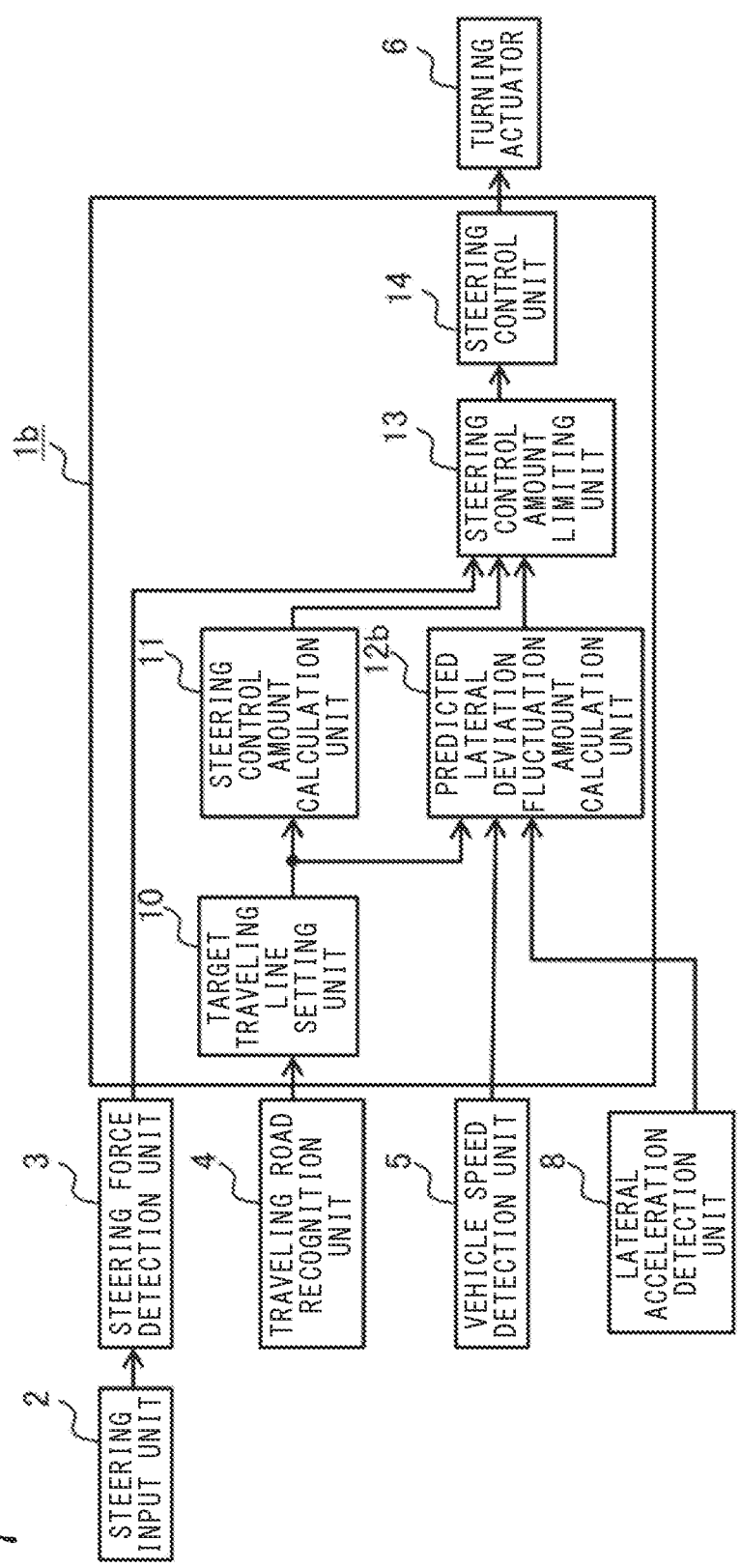
FIG. 7 is a block diagram showing the configuration of a vehicle steering system according to Embodiment 4.

FIG. 7 is a block diagram showing the configuration of a vehicle steering system according to Embodiment 4. The vehicle steering system in FIG. 7 is different from the vehicle steering system according to Embodiment 1 or Embodiment 2 in that the output of a lateral acceleration detection unit 8 is inputted to a predicted lateral deviation fluctuation amount calculation unit 12b of a steering device 1b.

The lateral acceleration detection unit 8 detects a lateral acceleration $G_y$ of the vehicle and outputs the lateral acceleration $G_y$ to the predicted lateral deviation fluctuation amount calculation unit 12b. On the basis of the target traveling line acquired from the target traveling line setting unit 10, the predicted lateral deviation fluctuation amount calculation unit 12b initially obtains a curvature $C_2$ of the target traveling line. Next, the predicted lateral deviation fluctuation amount calculation unit 12b obtains a lateral acceleration component $\Delta G_y$ deviating from the target traveling line, by the following equation from the obtained curvature $C_2$, the vehicle speed $V_x$ acquired from the vehicle speed detection unit 5, and the lateral acceleration $G_y$ acquired from the lateral acceleration detection unit 8, and outputs the lateral acceleration component $\Delta G_y$ as a predicted lateral deviation fluctuation amount to the steering control amount limiting unit 13. As for the positive/negative sign of the predicted lateral deviation fluctuation amount, similar to Embodiment 2, the direction deviating from the target traveling line is defined as a positive direction.

$$\Delta G_y = G_y - C_2 V_x^2 \qquad (3)$$

$\Delta G_y$ is the difference between the lateral acceleration of the vehicle and the lateral acceleration required for cornering on the target traveling line, that is, the value of the lateral acceleration component deviating from the target traveling line. If the value of the lateral acceleration component deviating from the target traveling line is the predicted lateral deviation fluctuation amount, when the predicted lateral deviation fluctuation amount is large, the vehicle can be regarded as moving in the lateral direction in the lane, and when the predicted lateral deviation fluctuation amount is small, the driver can be regarded as intentionally driving on a line different from the target traveling line. Therefore, the same effects as those of the vehicle steering system according to Embodiment 1 or Embodiment 2 can be achieved.

Embodiment 5

Figure 8:
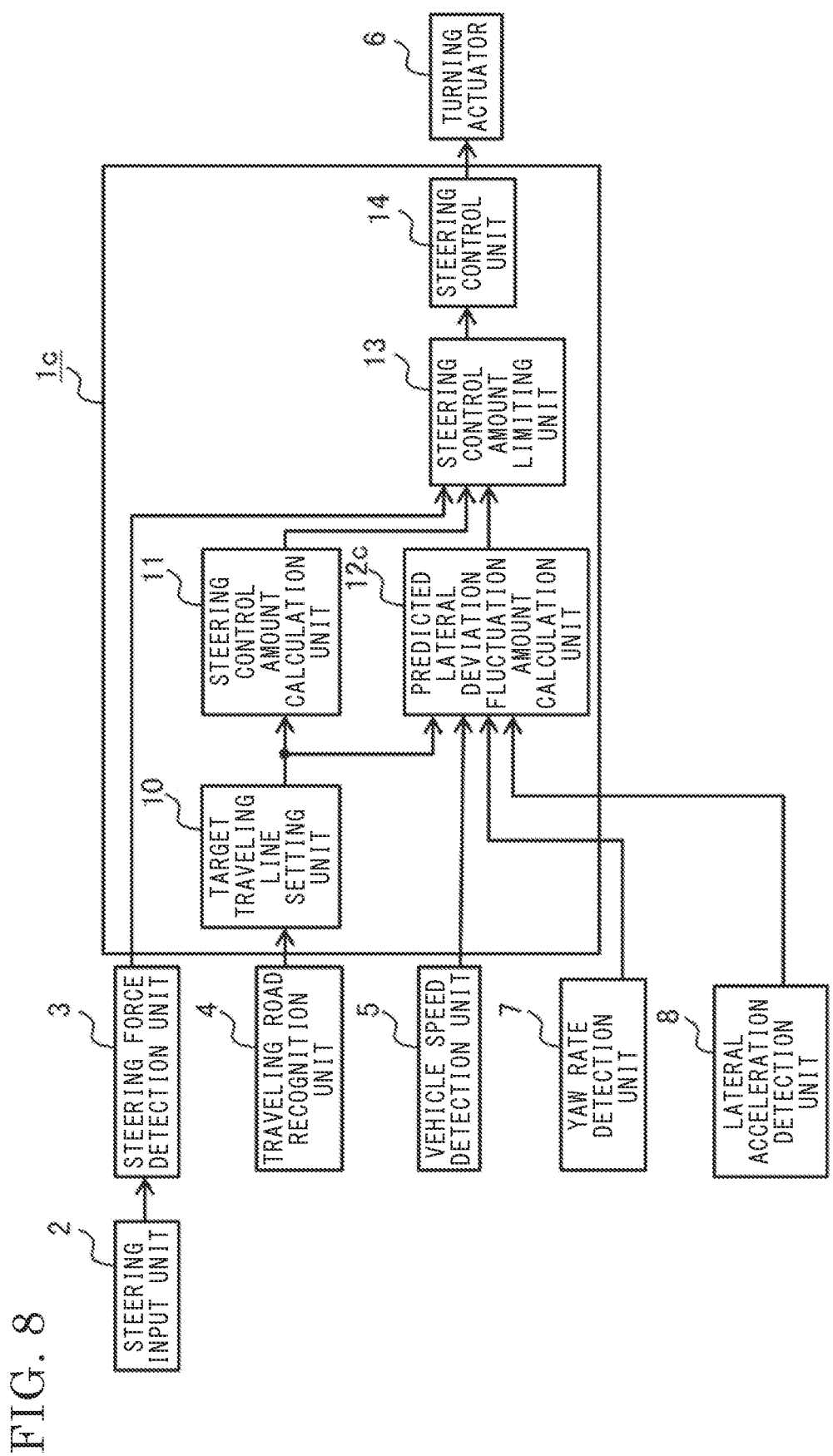
FIG. 8 is a block diagram showing the configuration of a vehicle steering system according to Embodiment 5.

FIG. 8 is a block diagram showing the configuration of a vehicle steering system according to Embodiment 5. The vehicle steering system in FIG. 8 is different from the vehicle steering system according to Embodiment 1 or Embodiment 2 in that the output of the yaw rate detection unit 7 and the lateral acceleration detection unit 8 is inputted to a predicted lateral deviation fluctuation amount calculation unit 12c of a steering device 1c.

The yaw rate detection unit 7 detects the yaw rate $\gamma$ of the vehicle and outputs the yaw rate $\gamma$ to the predicted lateral deviation fluctuation amount calculation unit 12c, which is the same as in the vehicle steering system according to Embodiment 3. The lateral acceleration detection unit 8 detects the lateral acceleration $G_y$ of the vehicle and outputs the lateral acceleration $G_y$ to the predicted lateral deviation fluctuation amount calculation unit 12c, which is the same as in the vehicle steering system according to Embodiment 4. The predicted lateral deviation fluctuation amount calculation unit 12c obtains a predicted lateral deviation fluctuation amount by using at least two values out of the lateral speed, the amount of change in the lateral deviation, the yaw angle, the yaw rate, and the lateral acceleration, and outputs the predicted lateral deviation fluctuation amount to the steering control amount limiting unit 13. For example, when all the values of the lateral speed, the amount of change in the lateral deviation, the yaw angle, the yaw rate, and the lateral acceleration are used, the respective values shown in equation (1), equation (2), and equation (3), the amount of change in the lateral deviation, and the yaw angle may be added to obtain the predicted lateral deviation fluctuation amount. When a plurality of values are selected and used from among the lateral speed, the amount of change in the lateral deviation, the yaw angle, the yaw rate, and the lateral acceleration, the corresponding values may be added to obtain the predicted lateral deviation fluctuation amount. As for the positive/negative signs of the lateral speed, the amount of change in the lateral deviation, the yaw angle, the yaw rate, and the lateral acceleration when the predicted lateral deviation fluctuation amount is obtained, similar to Embodiment 2, the direction deviating from the target traveling line is defined as a positive direction. Accordingly, the same effects as those of the vehicle steering system according to Embodiment 1 or Embodiment 2 can be achieved.

Figure 9:
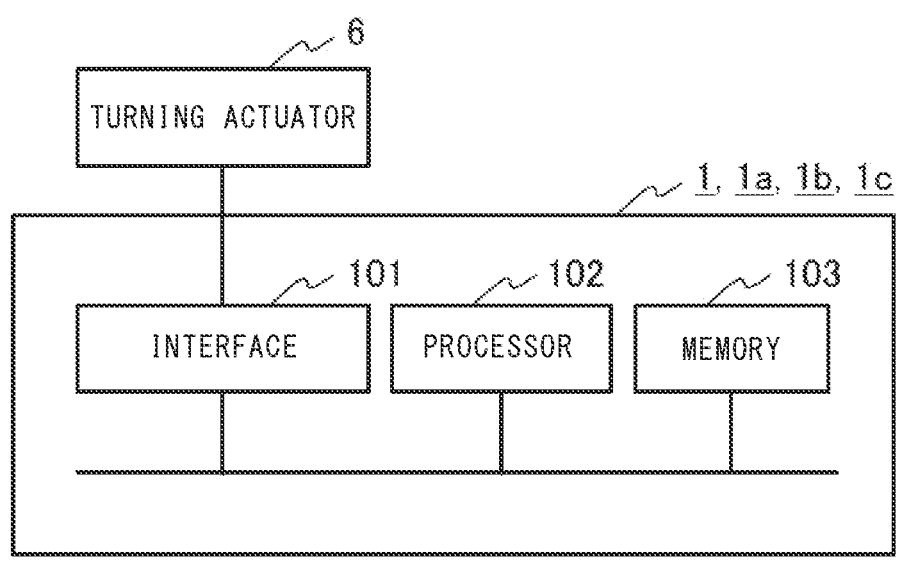
FIG. 9 is a diagram showing the hardware configurations of steering devices in the vehicle steering systems according to Embodiments 1 to 5.

FIG. 9 is a diagram showing the hardware configurations of the steering devices 1, 1a, 1b, and 1c of Embodiments 1 to 5. FIG. 9 shows the case where the target traveling line setting unit 10, the steering control amount calculation unit 11, the predicted lateral deviation fluctuation amount calculation unit 12, 12a, 12b, or 12c, the steering control amount limiting unit 13, and the steering control unit 14 of each of the steering devices 1, 1a, 1b, and 1c are configured by using a processor 102 such as a central processing unit (CPU) and a digital signal processor (DSP). In this case, the functions of the blocks of each of the steering devices 1, 1a, 1b, and 1c are realized by software, firmware, or a combination of software and firmware. The software or firmware is described as a program and stored in a memory 103. An interface 101 controls input and output of signals to and from the steering force detection unit 3, the traveling road recognition unit 4, the vehicle speed detection unit 5, the turning actuator 6, the yaw rate detection unit 7, and the lateral acceleration detection unit 8. FIG. 9 shows only the components to which the turning actuator 6 is connected via the interface 101. The processor 102 realizes the functions of the blocks of each of the steering devices 1, 1a, 1b, and 1c by executing various processes according to the program stored in the memory 103. The interface 101, the processor 102, and the memory 103 are connected to each other via a bus.

Although the disclosure is described above in terms of various exemplary embodiments, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS

1, 1a, 1b, 1c steering device
2 steering input unit
3 steering force detection unit
4 traveling road recognition unit
5 vehicle speed detection unit
6 turning actuator
7 yaw rate detection unit
8 lateral acceleration detection unit
10 target traveling line setting unit
11 steering control amount calculation unit
12, 12a, 12b, 12c predicted lateral deviation fluctuation amount calculation unit
13 steering control amount limiting unit
14 steering control unit
20 vehicle
21 traveling direction
22 target traveling line
101 interface
102 processor
103 memory

The invention claimed is:

1. A vehicle steering system for assisting steering operation such that a vehicle travels so as to follow a target traveling line, the vehicle steering system comprising:
   a steering wheel on which steering operation is performed by a driver;
   a steering force detector to detect a steering force inputted to the steering wheel;
   a steering control amount calculation circuitry to calculate a steering control amount for causing the vehicle to follow the target traveling line;
   a predicted lateral deviation fluctuation amount calculation circuitry to calculate a predicted lateral deviation fluctuation amount predicted as a lateral deviation fluctuation amount with respect to the target traveling line of the vehicle;
   a steering control amount limiting circuitry to calculate a steering control amount limit value on the basis of the steering force and the predicted lateral deviation fluctuation amount, and to output a limited steering control amount to which the steering control amount is limited by the steering control amount limit value; and
   a steering control circuitry to perform steering control of the vehicle on the basis of the limited steering control amount, wherein
   in a case where the absolute value of the steering force is the same, when the absolute value of the predicted lateral deviation fluctuation amount is large, the steering control amount limiting circuitry sets the steering control amount limit value to a value larger than or equal to that when the absolute value of the predicted lateral deviation fluctuation amount is small.

2. The vehicle steering system according to claim 1, wherein the predicted lateral deviation fluctuation amount-calculation circuitry calculates the predicted lateral deviation fluctuation amount on the basis of a lateral speed of the vehicle.

3. The vehicle steering system according to claim 1, wherein the predicted lateral deviation fluctuation amount-calculation circuitry calculates the predicted lateral deviation fluctuation amount on the basis of an amount of change in a lateral deviation between the vehicle and the target traveling line.

4. The vehicle steering system according to claim 1, wherein the predicted lateral deviation fluctuation amount-calculation circuitry calculates the predicted lateral deviation fluctuation amount on the basis of a yaw angle with respect to the target traveling line of the vehicle.

5. The vehicle steering system according to claim 1, further comprising a yaw rate detector to detect a yaw rate of the vehicle, wherein
the predicted lateral deviation fluctuation amount calculation circuitry calculates the predicted lateral deviation fluctuation amount on the basis of the yaw rate.

6. The vehicle steering system according to claim 1, further comprising a lateral acceleration detector to detect a lateral acceleration of the vehicle, wherein
the predicted lateral deviation fluctuation amount calculation circuitry calculates the predicted lateral deviation fluctuation amount on the basis of the lateral acceleration.

7. The vehicle steering system according to claim 1, wherein the predicted lateral deviation fluctuation amount-calculation circuitry calculates the predicted lateral deviation fluctuation amount on the basis of at least two values of a lateral speed of the vehicle, an amount of change in a lateral deviation between the vehicle and the target traveling line, a yaw angle with respect to the target traveling line of the vehicle, a yaw rate of the vehicle, and a lateral acceleration of the vehicle.

8. The vehicle steering system according to claim 1, further comprising:
a traveling road recognition circuitry to recognize a traveling road on which the vehicle travels, and to output traveling road information; and
a target traveling line setting circuitry to set the target traveling line on the basis of the traveling road information, and to output the target traveling line.

9. The vehicle steering system according to claim 1, wherein the predicted lateral deviation fluctuation amount depends on a speed of the vehicle.

10. A vehicle steering system for assisting steering operation such that a vehicle travels so as to follow a target traveling line, the vehicle steering system comprising:
a steering wheel on which steering operation is performed by a driver;
a steering force detector to detect a steering force inputted to the steering wheel;
a steering control amount calculation circuitry to calculate a steering control amount for causing the vehicle to follow the target traveling line;
a predicted lateral deviation fluctuation amount calculation circuitry to calculate a predicted lateral deviation fluctuation amount predicted as a lateral deviation fluctuation amount which is a fluctuation amount of a lateral deviation in which a value in a direction deviating from the target traveling line of the vehicle is positive and a value in a direction following the target traveling line of the vehicle is negative;
a steering control amount limiting circuitry to calculate a steering control amount limit value on the basis of the steering force and the predicted lateral deviation fluctuation amount, and to output a limited steering control amount to which the steering control amount is limited by the steering control amount limit value; and
a steering control circuitry to perform steering control of the vehicle on the basis of the limited steering control amount, wherein
in a case where a value of the steering force is the same, when the predicted lateral deviation fluctuation amount is large with respect to a positive direction, the steering control amount limiting circuitry sets the steering control amount limit value to a value larger than or equal to that when the predicted lateral deviation fluctuation amount is small with respect to the positive direction.

* * * * *